(12) United States Patent
Wei et al.

(10) Patent No.: US 11,318,407 B2
(45) Date of Patent: May 3, 2022

(54) AIR PURIFIER AND A METHOD FOR CONTROLLING AN AIR PURIFIER

(71) Applicant: KONINKLIJKE PHILIPS N.V., Eindhoven (NL)

(72) Inventors: Catherine Wei, Eindhoven (NL); Jing Su, Eindhoven (NL); Rui Ke, Eindhoven (NL); Declan Patrick Kelly, Eindhoven (NL); Zhiqiang Zhang, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 497 days.

(21) Appl. No.: 15/763,478

(22) PCT Filed: Sep. 18, 2016

(86) PCT No.: PCT/EP2016/072086
§ 371 (c)(1),
(2) Date: Mar. 27, 2018

(87) PCT Pub. No.: WO2017/055112
PCT Pub. Date: Apr. 6, 2017

(65) Prior Publication Data
US 2018/0290095 A1    Oct. 11, 2018

(30) Foreign Application Priority Data

Sep. 30, 2015  (WO) ................ PCT/CN2015/091218
Nov. 19, 2015  (EP) .................................... 15195287

(51) Int. Cl.
*B01D 46/46* (2006.01)
*F24F 11/30* (2018.01)
(Continued)

(52) U.S. Cl.
CPC ......... *B01D 46/46* (2013.01); *B01D 46/0038* (2013.01); *B01D 46/0086* (2013.01);
(Continued)

(58) Field of Classification Search
None
See application file for complete search history.

(56) References Cited

U.S. PATENT DOCUMENTS 5,722,587 A * 3/1998 Jung .................. F24F 6/12
236/44 A
2005/0207951 A1* 9/2005 Lee ..................... A61L 9/20
422/186.07

(Continued)

FOREIGN PATENT DOCUMENTS

CN    1715795 A    1/2006
CN    101699055 A    4/2010
(Continued)

*Primary Examiner* — Christopher P Jones
*Assistant Examiner* — Phillip Y Shao
(74) *Attorney, Agent, or Firm* — Schott, P.C.

(57) ABSTRACT

An air purifier (10) uses an air purifier filter unit (12) and a sensor (26) for sensing the matter to be filtered by the air purifier filter unit. By monitoring (18) the performance of the air purifier combined with information about the air purifier filter unit, it is possible to determine a volume of the space in which the air purifier (10) is deployed.

8 Claims, 5 Drawing Sheets

(51) Int. Cl.
*F24F 3/16* (2021.01)
*B01D 46/00* (2022.01)
*B01D 46/44* (2006.01)
F24F 110/50 (2018.01)
F24F 11/39 (2018.01)
F24F 8/50 (2021.01)

(52) U.S. Cl.
CPC .............. *B01D 46/444* (2013.01); *F24F 3/16* (2013.01); *F24F 11/30* (2018.01); *F24F 8/50* (2021.01); *F24F 11/39* (2018.01); *F24F 2110/50* (2018.01)

(56) References Cited

U.S. PATENT DOCUMENTS

| | | | | |
|---|---|---|---|---|
| 2006/0002836 | A1* | 1/2006 | Kim | F24F 8/192 |
| | | | | 423/210 |
| 2006/0173580 | A1* | 8/2006 | Desrochers | G01N 33/0075 |
| | | | | 700/276 |
| 2008/0093474 | A1 | 4/2008 | Suissa | |
| 2009/0289127 | A1 | 11/2009 | Tollens | |
| 2010/0186357 | A1 | 7/2010 | Takeda | |
| 2011/0130877 | A1 | 6/2011 | Lynch | |
| 2012/0097753 | A1 | 4/2012 | Kelly et al. | |
| 2014/0283682 | A1* | 9/2014 | Hamann | B01D 46/442 |
| | | | | 95/10 |
| 2015/0140919 | A1* | 5/2015 | Zwijack | F24F 11/30 |
| | | | | 454/256 |
| 2015/0297776 | A1* | 10/2015 | Conroy | G08B 23/00 |
| | | | | 239/11 |
| 2017/0189846 | A1* | 7/2017 | Cho | B01D 46/444 |
| 2017/0246486 | A1* | 8/2017 | Cazier | A61B 5/7282 |

FOREIGN PATENT DOCUMENTS

| | | |
|---|---|---|
| CN | 202507897 U | 10/2012 |
| CN | 103375872 A | 10/2013 |
| CN | 104315662 A | 1/2015 |
| GB | 2330308 B | 8/2002 |
| JP | H11-511545 A | 10/1999 |
| JP | 2008136975 A | 6/2008 |
| JP | 2014-142164 A | 8/2014 |
| JP | 2015-036591 A | 2/2015 |
| WO | 2004084954 A2 | 10/2004 |
| WO | 2008119068 A1 | 10/2008 |

* cited by examiner

AIR PURIFIER AND A METHOD FOR CONTROLLING AN AIR PURIFIER

This application is the U.S. National Phase application under 35 U.S.C. § 371 of International Application No. PCT/EP2016/072086, filed on Sep. 18, 2016, which claims the benefit of International Application No. PCT/CN2015/091218 filed on Sep. 30, 2015 and International Application No. 15195287.6 filed on Nov. 19, 2015. These applications are hereby incorporated by reference herein.

FIELD OF THE INVENTION

This invention relates to air purifiers.

BACKGROUND OF THE INVENTION

The use of standalone air purifiers is well known, for improving indoor air quality. The air purifier is for example used in a room to clean the air in the room. There are other air quality control measures which may be taken in a room, for example the release of chemicals into a room. These chemicals may be for giving a desired scent to a user, or they may be for promoting the growth of plants, or they may be for medical or other reasons.

The release of chemicals into a space should be controlled taking into account the volume of the space, but this is not readily available or detectable.

Another issue relating to air purifiers is that a customer will know that an air purifier is in use, but for many different types of pollution, the improved indoor air quality is not easily detected by the user.

Many air purifiers use a visual indicator, such as color change of a light or a sensor reading, to indicate the cleanliness of the air. However, the user does not have an olfactory perception of the improved air quality. This would give a more intuitive and natural indication to the user.

Many devices are known which release scent. The scent is generally used to mask an odor resulting from poor air quality or it may produce a desired scent based on the consumer's preference. However, the scent release designs do not indicate air cleanliness of the environment.

US 2010/186357 A1 describes an air cleaner which is placed on a floor or a desk and used so as to be located in the vicinity of a sidewall surface of a room. Further described is an air cleaner which is capable of enhancing an effect of improving an indoor air environment by enhancing an efficiency of circulating an air current without increasing an air flow volume. Most scent release devices also do not take into account the confined space where the device will be utilized. The devices may consequently result in high VOC (volatile organic compound) concentration in the indoor air. In a natural environment, the scent concentrations are typically lower than produced by scent release devices.

For example, the terpene concentration in a forest is at the level of several hundreds of pptv (parts per trillion volume), but a commercial air freshener could release scent chemicals with concentration 10-100 times higher. Instead of enhancing human perception, an overdose of scent may harm health by causing an allergic reaction or other irritation. An overdose of VOCs may also react with other air contaminants to yield potentially harmful secondary products. For example, terpenes can react rapidly with ozone in indoor air generating many secondary pollutants, such as fine particles.

The control of scent release is known to enhance the air quality perception. However, in many scent release systems, subjects become aware of a scent over exposure, because high scent concentrations are used and/or due to long term exposures without any dose control. People also easily become accustomed to a continuous scent environment without being aware of the scent existing. In this case, the physiological and psychological effects of the scent are diminished. Therefore, a periodic release rather than continuous release is desired to optimize the physiological and psychological effects of a scent.

SUMMARY OF THE INVENTION

There remains a need for a system which can determine the volume of a space in which it is used, for example to then enable a scent to be used to convey information about the cleanliness of the air in a space. However, the volume information would be of interest more generally for any other control or monitoring of an enclosed environment.

The invention is defined by the independent claims. The dependent claims define advantageous embodiments.

According to examples in accordance with an aspect of the invention, there is provided an air purifier, comprising:
  an air purifier filter unit;
  a sensor for sensing the matter to be filtered by the air purifier filter unit; and
  a controller,
  wherein the controller is adapted to:
    monitor the performance of the air purifier using the sensor;
    derive information about the volume of the space in which the air purifier filter system is deployed based on information about the air purifier filter unit and the sensor output.

This enables an air purifier to determine the volume of the space in which it is used. The volume information may be used in various ways. For example, it may be used to assist in the delivery of a chemical to the volume so that a desired concentration is reached. This may be a chemical for people (such as a scent or a pharmaceutical) or for plants (such as $CO_2$ for plant growth).

The air purifier filter unit may comprise a machine readable identifier which stores information about the air purifier filter unit performance. In this way, the filter unit is read by a receiving part of the air purifier. By comparing the filtering performance detected by the sensor with the filter capabilities, the volume of the space in which the filter is used may be derived.

The controller may be adapted to derive a clean air delivery rate and to derive information about a reference volume of the space from the clean air delivery rate obtained during a calibration procedure, during which the air purifier is operated in the space and the space is configured to be non-ventilated.

By monitoring the filter performance in a non-ventilated space, the volume can be determined for future use in controlling the release of a chemical, such as a scent. In addition, volume changes may be identified, for example relating to spaces with open doors or windows, or else indicating that the system has been moved to a different space.

The controller may be adapted to determine if the space is ventilated based on comparing the currently determined volume with the reference volume.

The air purifier may further comprise a chemical release device, wherein the controller is adapted to control the chemical release device in dependence on the information about the volume. The chemical release device may comprise a scent release device.

In this system, an air purifier is coupled with a scent release device, collaborating with the air purifier. The amount of scent to be dispensed may be controlled to be dependent on the room volume estimated by the air purifier so that the concentration in the space is more accurately controlled. The scent release may be controlled so that olfactory perception of the scent is used an indicator of the air cleanliness. An overdose of the scent in a confined space may also be prevented. The controller is for example adapted to control the scent release device with periodic bursts of scent release.

The scent release device is preferably controlled in dependence on the output of the sensor. In this way, not only is the volume taken into account, but also the pollution level. In this way, the air is cleaned when the air purifier is turned on, and the scent release may for example be controlled so that it is only applied in the clean air. In this way, the scent may be used to provide an olfactory signal to the user that the air purifier is correctly operating. Scent release may be prevented when it is determined that the space is ventilated.

The controller may be further adapted to derive end of life prediction information for the air purifier filter unit based on the information about the air purifier filter unit and the sensor information. This enables more accurate end of life prediction by taking account of the pollution levels that have been experienced.

Examples in accordance with a second aspect of the invention provide a method of controlling an air purifier, the method comprising:

sensing the matter to be filtered by an air purifier filter unit;

monitoring the performance of the air purifier based on the sensing; and deriving information about the volume of the space in which the air purifier is deployed based on information about the air purifier filter unit and the sensing.

This method enables volume information to be obtained from an air purifier system.

The method may comprise reading information about the air purifier filter unit performance from a machine readable identifier of the air purifier filter unit. This provides an automated process, although an alternative is for a user to enter manually the information into the system using a user interface.

The method may comprise deriving a clean air delivery rate and deriving information about a reference volume of the space from the clean air delivery rate obtained during a calibration procedure, during which the air purifier filter system is operated in the space and the space is configured to be non-ventilated. This provides a calibration operation which enables a room volume to be determined.

It is for example possible to determine if a space is ventilated by comparing the currently determined volume with the reference volume.

The air purifier may comprise a chemical release device, such as a scent release device, and the method comprises controlling the chemical release device in dependence on the information about the volume.

Scent release may for example be prevented when there is no point as a result of the room ventilation. The scent release device is preferably controlled with periodic bursts of scent release.

The method may comprise controlling the scent release device in dependence on the output of the sensor. In this way, the scent release may be used as an indicator of the air quality.

An end of life prediction may be obtained for the air purifier filter unit based on the information about the air purifier filter unit and the sensor information.

The methods defined above may be implemented by a computer program.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an air purifier which uses an air purifier filter unit and a sensor for sensing the matter to be filtered by the air purifier filter unit. By monitoring the performance of the air purifier combined with information about the air purifier filter unit a volume of the space can be determined.

One application of interest is the combination of an air purifier with a scent release device. Examples based on this combination will be described below. However, it will be understood that there are other applications for the invention. In general, determination of the volume in which an air purifier is used may have various benefits. The information may be used for the control of the air purifier itself, for example the fan speed, or it may be of interest for the control of other devices. These other devices are not limited to scent release devices by may be devices for releasing other chemicals. One example is the release of $CO_2$ for managing plant growth. Another example is the release of chemicals for the treatment or health management of livestock or patients in enclosed spaces. Again, the volume of the enclosed space would be of interest. Indeed any application where the volume of an enclosed space is of interest, and in which air purification is employed, may be considered.

Figure 1:
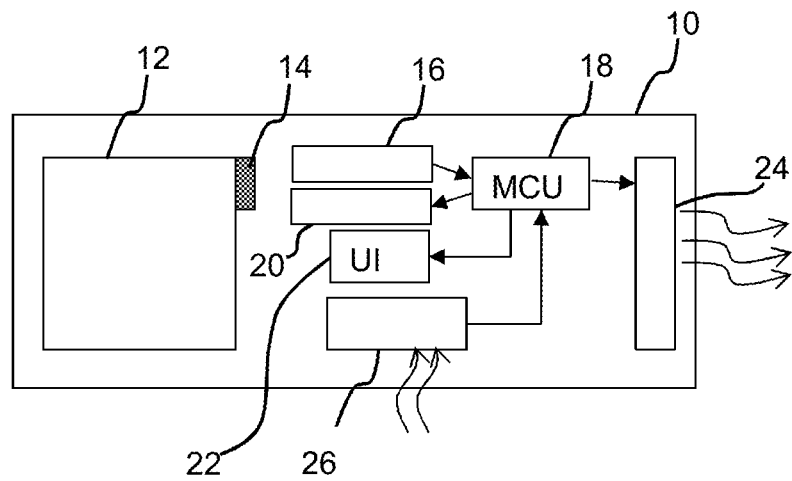
FIG. 1 shows an example of air purifier system.

FIG. 1 shows a first example of air purifier 10, which houses a replaceable filter unit 12. The filter unit 12 has a machine readable identifier 14 which provides information concerning at least the filter unit type. This could be in the form of simple bar codes or a two-dimension bar code. The air purifier has a reader 16 for reading the machine readable identifier 14, and this may be an electronic reader circuit or an optical reader circuit, or a mechanical read circuit or a radio wave based reader circuit (such as an RFID based system). The read information is provided to a master control unit ("MCU") 18 which controls a fan 20 and has a user interface 22 for at least providing output information to a user. The filter information may of course be input manually into the user interface instead of having an automated system.

The air purifier also includes a scent release device 24 which is also controlled by the master control unit 18, and a sensor 26 for sensing the pollutant to be filtered by the filter unit 12. In an alternative embodiment of the air purifier, the scent release device 24 may be located in a different physical housing than the filter unit 12, and the scent release device 24 may be controlled by the MCU 18 via a wireless connection.

When the filter unit 12 is installed in the air purifier 10, the reader 16 reads the identifier 14 and transfers the data to the MCU 18. In the standalone case of FIG. 1, the MCU 18 uses the identifier data to control the user interface 22, for example to identify when the filter unit needs to be changed and to control the fan 20, for example based on a mode of operation such as a low noise mode or a powerful filtering mode.

The control of known scent release devices is limited by the sensitivity of aromatic sensors, and it means that the concentration of the released scent is generally not detected or controlled. The air purifier 10 of FIG. 1 addresses this problem by estimating the room volume (i.e. the space in which the air purifier is deployed) based on the already-known filter performance as read from the identifier 14 and from the clean air delivery rate (CADR) which is recorded and calculated by the sensor 26.

Based on the room volume, the scent release device can be controlled to avoid an overdose of scent delivery. FIG. 1 shows the program to calculate the releasing scent amount.

FIG. 1 shows a standalone example, and the filter unit identifier or the air purifier must include the necessary data on the filter performance. An alternative is to provide a connection between the MCU 18 and an external data source which is implemented as an application running on an external device. Alternatively, the external source could be on a remote web server accessed through the Internet either directly from the air purifier (e.g. via local WiFi) or via an application running on an external device. The system may also include external sensors, for example for detecting indoor or outdoor environmental conditions, to provide further information to the MCU.

Figure 2:
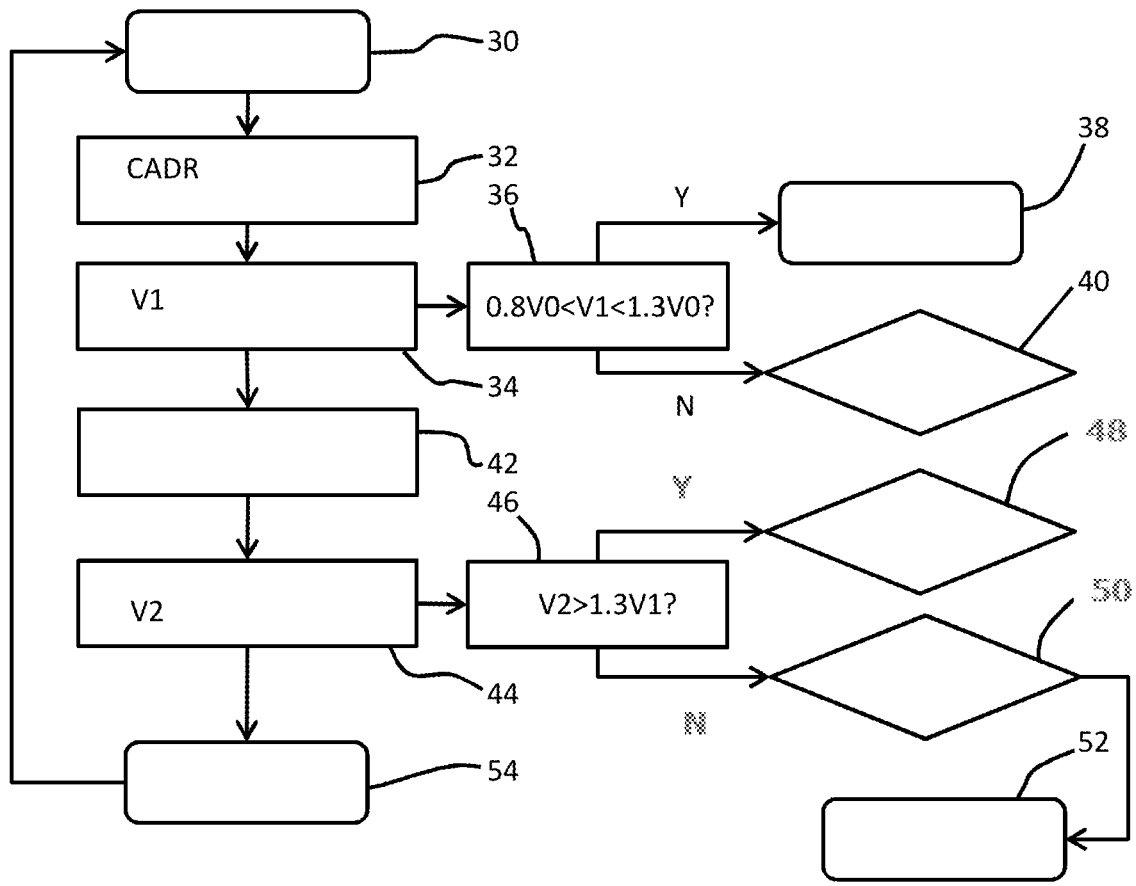
FIG. 2 shows a method of determining a room volume.

FIG. 2 shows a method for determining the required scent delivery.

In step 30, the air purifier is started at time t0.

In step 32, a clean air delivery rate (CADR) curve is recorded by the sensor 26, which for example comprises a particle sensor.

In step 34, the room size is calculated based on a first period of data, for example 20 minutes. This is completed at time t1. This volume size is named V1.

When the air purifier is used for the first time, the user interface 22 instructs the customer to run the air purifier for the first time in a sealed room. The air purifier will then calculate the room volume in the manner explained above, to yield an initial room volume V0 based on the initial filter performance (CADR) which is read from the filter (or based on an initial program setting) and the CADR curve recorded in these first 20 minutes during the air purification process.

When the current volume V1 has been determined, it is compared with the most recent room volume stored, for example the room volume V0 obtained during the calibration process. This comparison takes place in step 36, and it is determined if the currently measured volume V1 falls within the range 0.8V0 to 1.3V0. This volume determination process is reset each time the air purifier is located in a new room.

If V1 is in indeed in the range of 0.8V0 to 1.3V0, then V1 is recorded as the current room volume in step 38. Thus, the stored room volume is updated to take account of small room volume changes, for example resulting from different amounts of furniture in the room.

If V1 is out of the range of 0.8V0 to 1.3V0, then either the air purifier location has changed or the room is not properly sealed. In this case, scent release will not be applied, and this is represented by step 40.

The air purifier continues to operate in step 42 until time t3 at which the air purifier stops because the indoor air is determined to be clean. After scanning the data collected from t0 to t3, the time when the last discontinuity in the sensed signal appears is defined as t2. This explained further below.

If a window or door was opened at least once between times t0 to t3, then t2 expresses the last time when the window or door was open. A new room volume V2 is calculated in step 44 based on the data from time t2 to t3. This updated volume calculation of V2 may for example help to determine if the room is still connected to the outdoor air.

In step 46 it is determined if the latest room volume calculation V2 is larger than 1.3V1. If it is, the room is still connected to the outdoor air, and the scent release will not be applied to avoid waste, as represented by step 48.

If V2 is smaller than 1.3V1, which means the room was opened once and sealed afterwards, scent amount will be calculated in step 50 based on V1, and corresponding scent will be released by the scent release device 24 in step 52.

This method thus releases a dose of scent after the air cleaning process has ended, in order to indicate to the user that the air is clean. It provides the scent release as a burst at the end of the air cleaning process.

The scent release component contains a scent source, which could be solid, liquid, or gaseous. According to the calculation results, a certain amount of scent will be released from the scent release component through an accurately controlled approach, such as heating, spraying, or vibrating. The scent releasing process is only carried out once and completed within a few minutes. The types of scent can be pre-selected based on the customer preferences.

At time t4 in step 54, the air purifier determines that the indoor air needs to be purified again, and the whole process is repeated from step 30.

In order to prevent the negative effects of an overdose of scent, the room volume is calculated each time the air purifier has been operated, instead of using only the room volume V0 obtained during the calibration all the time. If new furniture is moved into the room, or many people are present in the room, the measured volume V1 will be smaller than V0, and V1 will then be used to calculate the scent release amount.

If the air purifier location is changed, the initial room volume V0 will then be reset with the user guided to operate the air purifier in the new room with the room sealed for the new calibration step.

The approach above is based only on calculations of the room volume. The customers may also type in the room volume (Vc) into the scent release controlling system (or to an app installed in a smartphone or other control device) to aid in determining the scent concentration. The scent concentration may be restricted to be under 1 ppm calculated based on V0, for example the scent concentration may be a maximum of 1 ppm*V0/Vc.

The way the room volume may be calculated will now be described in further detail.

Figure 3:
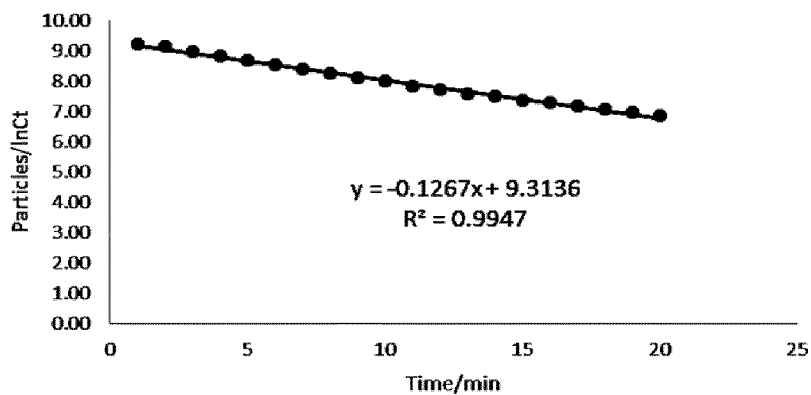
FIG. 3 shows a particle count over time which arises during filtering.

FIG. 3 shows an example of a CADR curve recorded by the particle sensor 26 during the first 20 minutes when the air purifier is running. The y-axis shows the natural logarithm of a particle number count (Ct) and the x-axis shows time in minutes.

The data collected are listed in the table below.

| | | | | Time/min | | | | |
|---|---|---|---|---|---|---|---|---|
| | 1 | 2 | 3 | 4 | 5 | ... | i | ... | 20 |
| Ct | $Y_1$ | $Y_2$ | $Y_3$ | $Y_4$ | $Y_5$ | ... | $Y_i$ | ... | $Y_{20}$ |

The data can be fit to a linear formula: $\ln(Y) = -ax + k$

In the formula, the coefficient a is, in one example of best fit approach, calculated by the following formula:

$$a = \frac{20\sum_{i=1}^{20} x_i \ln(y_i) - \sum_{i=1}^{20} x_i \sum_{i=1}^{20} \ln(y_i)}{\left(\sum_{i=1}^{20} x_i\right)^2 - 20\sum_{i=1}^{20} x_i^2}$$

The calibration room volume (V0 in m³) is then calculated by the following formula:

$$V0 = \frac{CADR \times \left[\sum_{i=1}^{20} x_i \ln(y_i) - \sum_{i=1}^{20} x_i \sum_{i=1}^{20} \ln(y_i)\right]}{3 \times \left[\left(\sum_{i=1}^{20} x_i\right)^2 - 20\sum_{i=1}^{20} x_i^2\right]}$$

CADR is the filter unit performance in m³/h.

The results of some experiments are now presented.

In a first experiment, four air purifiers were applied in four rooms. The room volumes were calculated (Vcal) according to the CADR curve recorded by the particle sensor. At the same time, the total room volumes were measured by hand (Vmea). The results are shown in the table below together with the ratio Vcal/Vmea. The calculated volumes are mainly within 75% to 85% of the measured room volumes, which is reasonable if the volume of furniture and other decorative items occupy 15%~25% of a room volume.

| Room No. | CADR (m³/h) | $V_{cal}$ (Calculate room volume, m³) | $V_{mea}$ (Measured room volume, with furniture, m³) | $V_{cal}/V_{mea}$ |
|---|---|---|---|---|
| 1 | 330.48 | 43.03 | 51.75 | 83.15% |
| 2 | 339.84 | 79.77 | 104.70 | 76.19% |
| 3 | 320.94 | 76.41 | 92.35 | 82.74% |
| 4 | 324.72 | 58.82 | 69.91 | 84.17% |

The table below shows repeated measurements in four other rooms. Each row relates to measurement at a different time, and each column relates to a different room. The same air purifiers and filters were used during the experiments in each room.

| | Calculated room 1 volume (m³) | Calculated room 2 volume (m³) | Calculated room 3 volume (m³) | Calculated room 4 volume (m³) |
|---|---|---|---|---|
| | 50.53 | 76.23 | 79.77 | 86.27 |
| | 47.08 | 87.29 | 78.67 | 76.41 |
| | 64.80 | 66.81 | 79.77 | 90.66 |
| | 59.23 | 73.14 | 99.37 | 82.29 |
| | 63.31 | 65.20 | 80.91 | 86.27 |
| | 65.57 | 88.72 | 97.66 | 77.52 |
| Average | 58.42 | 76.23 | 86.03 | 83.24 |
| Measured room volume (m³) | 51.75 | 69.91 | 104.70 | 92.35 |
| $V_{cal}/V_{mea}$ (%) | 112.89 | 109.04 | 82.16 | 90.13 |

For large rooms, considering the volume of furniture, the room volume calculation based on the CADR curve is quite reliable. For small rooms, because of the complex variation, the room volume calculation is typically 15 to 20% larger than the actual room volume. A correction factor may thus be used for rooms smaller than a certain volume (e.g. 80 m³).

An unsealed situation can be detected by the system, for example if a calculated room volume is much greater than the calibration volume. The scent release device may then be controlled not to release scent when the calculated room volume is larger than a certain value (e.g. larger than 1.3 times the original room volume as in FIG. 2). In this case the program will consider that the room is not properly sealed, so that the scent release will not achieve the desired effect.

Figure 4:
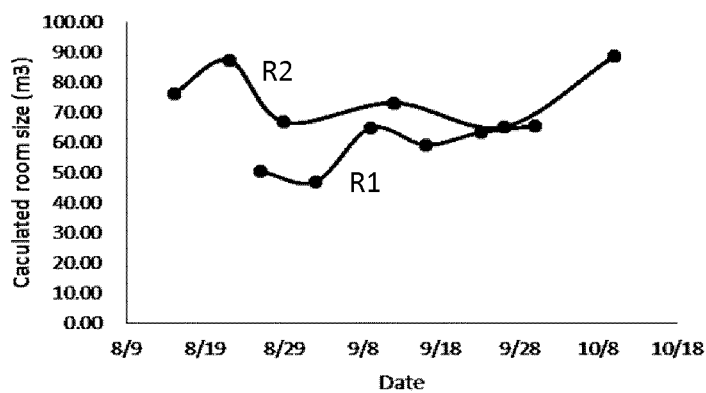
FIG. 4 shows room volume estimations for two small rooms at different times.
Figure 5:
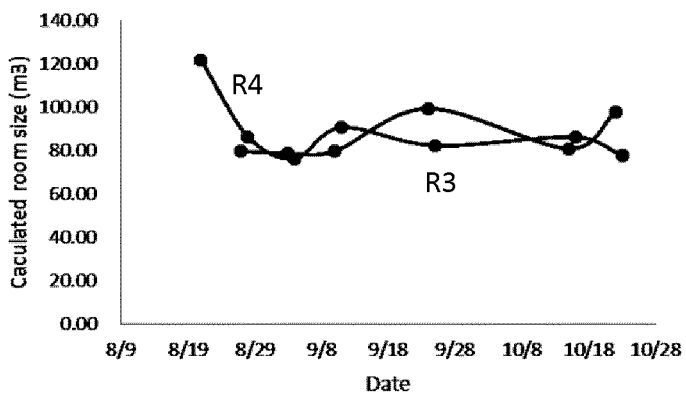
FIG. 5 shows room volume estimations for two large rooms at different times.

Measurement data for rooms 1 to 4 over a longer time period is plotted in FIGS. 4 and 5. FIG. 4 shows the measurements for the two smaller rooms, room 1 and room 2 (shown as plots R1 and R2). The x-axis gives the dates when the measurements were taken and the y-axis plots the estimated room size. FIG. 5 shows the measurements for the two larger rooms, room 3 and room 4 (shown as plots R3 and R4). The plot for room 4 shows one particularly high room size calculation, and this corresponds to a ventilated room.

The system described above additionally enables a more accurate end of life prediction for the air purifier filter unit to be obtained.

The most common current approach for an air purifier is to remind consumers to change the filters based on air flow through the filter. In some cases, only a timer is used. For instance, a High-Efficiency Particulate Arresting (HEPA) filter is suggested to be replaced every half a year, and an activate carbon filter could be replaced every three months. Particle sensors may be used to determine the amount of pollution to which the filter has been exposed over time, but these count particles by numbers, whereas the filter performance or particle pollution limit are determined by the particle mass.

Due to the various situations of indoor air and the pollution of outdoor air, deciding the filter life time based only on time or the air flow rate is far from ideal. For example, in a newly decorated room, an activated carbon filter should be replaced much more often than the other filters. Meanwhile, in heavy polluted cities, a HEPA filter needs to be changed more frequently.

The ability to show consumers the real filter performance and the level of pollutants that have been removed, in combination with an accurate reminder for the time to change the filter is of particular interest to customers.

The system described above provides a real-time filter performance (CADR) calculation. The CADR curve is automatically recorded by the pollutant sensor and calculated during the air cleaning process. The removed pollutant amounts may also be calculated based on the CADR curve.

This information may then be presented to a user from a visual display, which explains the filter status. The real-time pollutant concentration may also be shown to give consumers a direct sense of the efficiency of the air purifier.

An example of how to derive the required information will be explained based on a particle removing process as an example.

An indoor particle concentration obeys the following formula based on the mass conservation law:

$$\frac{dC}{dt} = k_v P_p C_{out} - (k_0 + k_v)C - \frac{CADR}{V} \times C$$

In the formula:
C Indoor particle concentration, mg/m³;
$P_P$ Penetration coefficient of particles from outdoor to indoor, normally in civil house this is around 0.8;
$C_{out}$ Outdoor particle concentration, mg/m³, could be obtained from an authorized website after setting the location;
$k_0$ Particle natural sedimentation rate, h⁻¹, normally around 0.2 h⁻¹;
$k_v$ Air changing rate, h⁻¹;
V Room volume, m³;
CADR Clean air delivery rate, m³/h.

Figure 6:
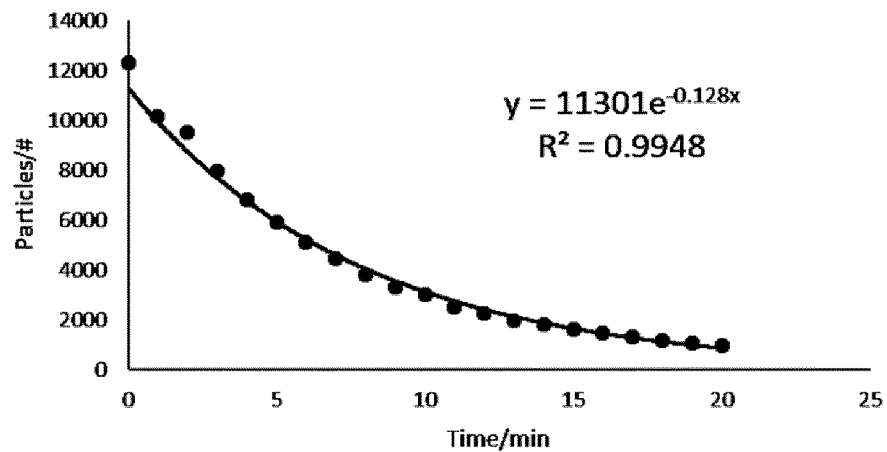
FIG. 6 shows a first particle sensing curve.

FIG. 6 shows a typical CADR curve recorded by a particle sensor this time using a linear scale on the y-axis. The recorded CADR curve can be expressed by the formula:

$$C = m \times e^{-kt}$$

k is thus the exponential decay constant in respect of the concentration curve.
By combining the above two equations, the following formula is obtained:

$$\frac{dC}{dt} = -km \times e^{-kt} = k_v P_p C_{out} - (k_0 + k_v)C - \frac{CADR}{V} \times C$$

By substituting $-km \times e^{-kt} = -kC$:

$$\left(\frac{CADR}{V} - k + k_0 + k_v\right) \times C = k_v P_p C_{out} \quad \text{Eq. 1}$$

$$\frac{CADR}{V} = \frac{k_v p_p C_{out}}{C} + k - k_0 - k_v$$

$$\frac{CADR}{V_0} = \frac{0.8 k_v C_{out}}{C} + k - k_v - 0.2$$

As explained above, the initial CADR is used to calculate the initial room volume V0. This is obtained when the air purifier is operated for the first time in a sealed room.

The system then calculates the room volume as explained above, and also the air changing rate ($k_v$) in the room. A low air flow rate may be applied for an initial period, such as the 20 min period mentioned above, then a high air flow rate is applied to quickly remove the pollutants. Based on the data collected from these two periods, CADR curve under low flow rate ($CADR_l$) and high flow rate ($CADR_h$) can be derived, each with their own respective air changing rate $k_l$ and $k_h$:

$$\frac{CADR_l}{V_0} = \frac{0.8 k_v C_{out}}{C} + k_l - k_v - 0.2$$

$$\frac{CADR_h}{V_0} = \frac{0.8 k_v C_{out}}{C} + k_h - k_v - 0.2$$

The values $CADR_l$ and $CADR_h$ are CADR values obtained by experiments in an ideal laboratory chamber, and recorded as the filter's initial information.

$k_l$ and $k_h$ are CADR curve coefficients obtained under low flow rate and high flow rate separately in consumer's home, based on the results of the initial running of the air purifier.

$C_{out}$ is obtained from a database, for example of the internet, $k_l$ and $k_h$ are calculated from the first time running results.

This means there are only two unknown parameters, $V_0$ and $k_v$, and these can be calculated based on the results of first time running $V_0$ and $k_v$ can then be used as the initial parameters for the room the following tests to obtain real-time CADR values.

In particular, by subtracting the two formulae above, $V_0$ is calculated and recorded in the system as the room volume. By introducing a suitable maximum value of C (for example based on national standards for maximum concentration levels), such as 0.035 mg/m³, $k_v$ is obtained as the air changing rate of the current room.

Figure 7:
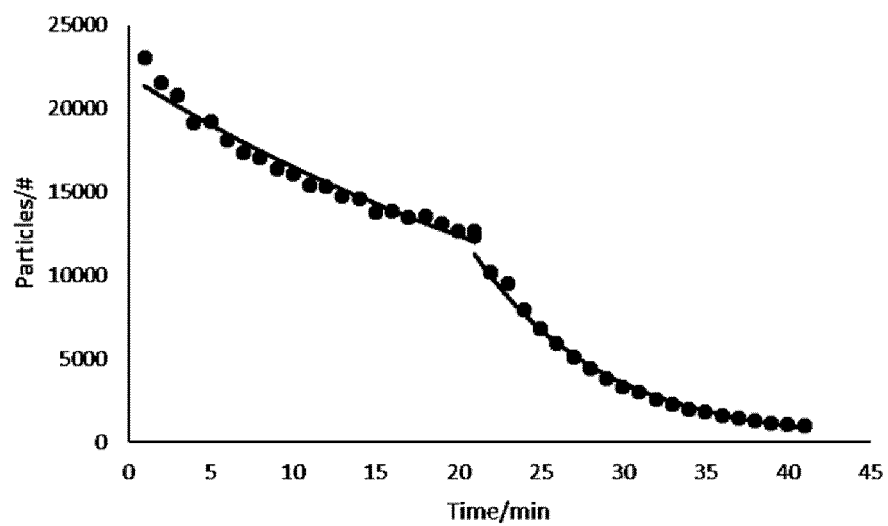
FIG. 7 shows a second particle sensing curve with two different flow rates applied.

FIG. 7 shows an example of the CADR curve when low and high flow rates are applied in sequence. After the initial calibration, real-time filter performance (CADR) calculation is conducted. During the operation of the air purifier, consumers may manually open a window and/or door to bring outdoor air inside.

Figure 8:
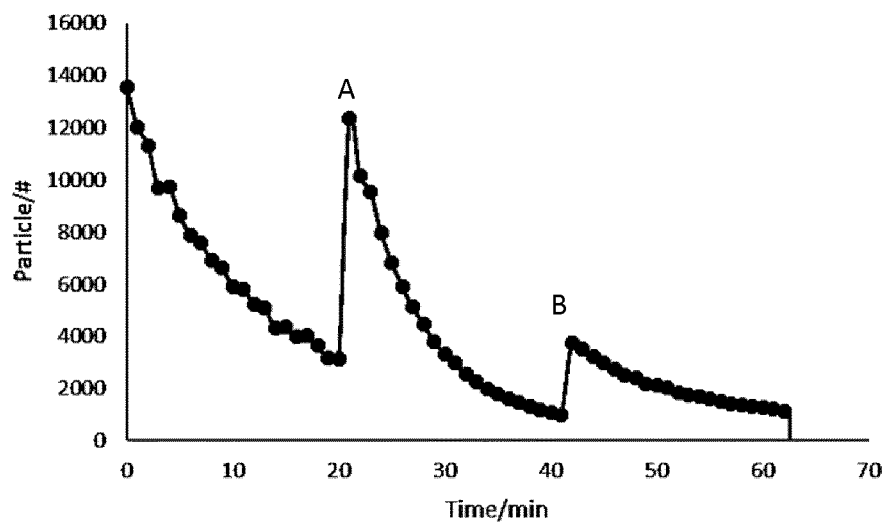
FIG. 8 shows a third particle sensing curve with door/window opening events.

FIG. 8 shows an example of a CADR curve recorded when the room is opened several times during operation of the air purifier. As shown, there are two discontinuities in the CADR curve, which are defined as point A and B. Considering the influence on the CADR calculation caused by air exchanging between outdoors and indoors, two situations are defined:

A window connecting the outdoor air is opened once and closed a short time later. For example, in FIG. 8 at time A. In this case, the last discontinuous point will be selected and the real-time CADR value will be calculated based on the data collected from time A.

A window connecting the outdoor air is kept open. For example, in FIG. 8 at time B. Under this kind of situation, the calculated real-time CADR will have a big difference compared to the last CADR, which happens very rarely in a real usage process. If the calculated real-time CADR value is much lower (eg. 20%) than the last CADR, then it is determined that the window was continuously open, and this result is not suitable for lifetime calculation. In this case, the second-to-last discontinuous point will be detected and the real-time CADR value will be calculated based on the data from the second-to-last discontinuous point.

Every time after running the air purifier to clean the indoor air, a real-time CADR is calculated according to the formula Eq. 1 above, since $V_0$ and $k_v$ are already calculated and recorded in the system after the first time running. The exponential decay value k can be obtained by using a line of best fit for the data which is collected in the first 20 minutes from the CADR curve (or the first 20 minutes since the last discontinuous point), and $C_{out}$ is provided from an authorized website according to the location, as mentioned above.

By introducing C as 0.035 mg/m³, the CADR value is calculated and recorded as the real-time CADR, which accurately relates to the current filter performance after cleaning indoor air.

An amount of the removed pollutant can also be calculated. From the experiments in a laboratory chamber, the filter performance (CADR) and cumulate clean mass (CCM) has a very good linear relationship.

Figure 9:
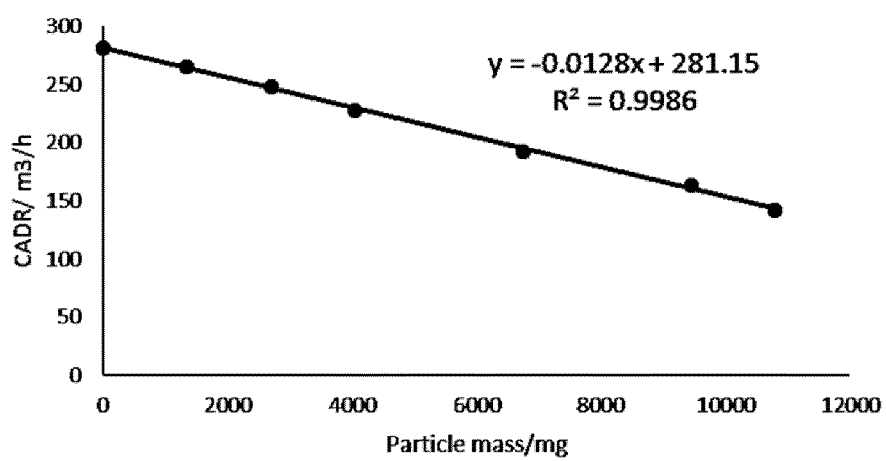
FIG. 9 shows a CADR curve.

FIG. 9 shows a CCM test result showing the CADR versus particle mass. A stable decrease of the CADR is observed during the particle filtering process. Every filter CCM curve is also included in the initial filter information which is initially read by the air purifier. Since the real-time CADR is calculated and recorded in the system after every run, the current cumulate particle mass may also be calculated according to the CCM curve. The amount of the pollutant removed in the last run can then be provided to the consumer in a visible way.

The lifetime definition of a filter is the time when the real-time CADR has dropped to half of the initial CADR value. A visible reminder is provided to the consumer when the CADR drops to a certain level (e.g. 60% of initial CADR value), so that consumer is alerted to the need to change the filter in advance.

When the air purifier location is changed to another room, a new room volume V2 is firstly calculated based on real-time CADR as explained above. Then a new V2 is recorded to calculate the new CADR value. $k_v$ is considered to be the same between rooms.

The table below shows air purifier running cycles.

| Run | Room volume | CADR (m³/h) |
|---|---|---|
| 1 | $V_1$ | $CADR_1$ |
| 2 | $V_1$ | $CADR_2$ |
| ... | $V_1$ | ... |
| i − 1 | $V_1$ | $CADR_{i-1}$ |
| i | $V_2$ | $CADR_i$ |
| ... | $V_2$ | ... |
| j | $V_2$ | $CADR_j$ |

The life time identifier may be used for filters from multiple suppliers, if the initial CADR value and the CCM information is available. Thus, for filters without a machine readable identifier, the user interface enables consumers to type-in the information or a two dimensional code scan may be used to obtain the filter information.

If the filter is moved to another type of purifier with different flow speeds which has the sensor reading and universal calculation function, the real-time filter status may be read from the recorded data base online.

The CCM information for filter is read out and the corresponding CADR in chamber will be obtained.

According to FIG. 9, if the current CCM (absorbed particle mass on the x-axis) is known, the filter CADR can be derived according to the data obtained in the test chamber. The y-axis of FIG. 9 is the CADR when tested in a chamber, which will be named the "chamber CADR" value.

The one pass efficiency of the filter in the previous air purifier can be converted to take account of the new filter location. Using the one-pass efficiency of the previous air purifier, the chamber CADR value of the current air purifier can be calculated.

The new CCM curve of the new air purifier can then be estimated according to chamber CADR value and the loaded CCM. A real-time CADR is then measured as before and the room size can be calculated as explained above. Consequently, the filter lifetime in new air purifier will be generated.

Figure 10:
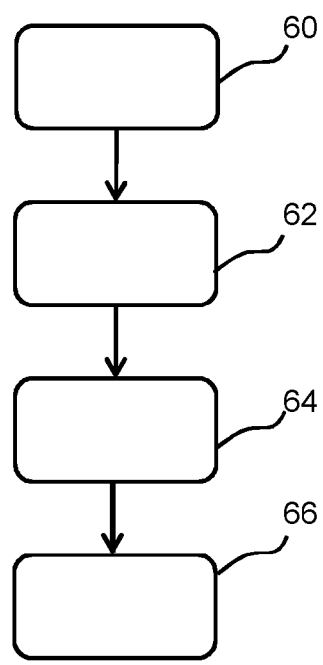
FIG. 10 shows an air purification method.

FIG. 10 shows the method of controlling an air purifier.

In step 60 the matter to be filtered by the air purifier filter unit is sensed.

In step 62 the performance of the air purifier is monitored, and in step 64 information is derived about the volume of the space in which the air purifier is deployed based on information about the air purifier filter unit and the sensor information.

In step 66 a scent release device is controlled in dependence on the information about the volume.

As is clear from the description above, information about the filter is needed by the master control unit. A number of methods can be considered to provide machine readable filter identification or information. Examples make use of optical fibers, color recognition, measurement of an electrical parameter such as resistance or inductance, light reflection properties, force measurement to determine a mechanical property, mechanical measurement of a pin configuration.

One specific example makes use of a simple barcode or 2D barcode which is used to read the filter type or a unique filter ID. Such a solution has the advantage of simplicity, but has the limitation that it can be very easy for a third party to copy the bar code.

An alternative solution is to use RF-ID tags on the filter as identifiers. In this case, an RF-ID reader (and optionally writer) is added to the air purifier. The RF-ID tag could instead be read via a mobile phone and a connected application can be used to communicate the result to the air purifier. Furthermore, RF-ID tags can be used to implement security features.

The release of a scent is for example used to provide an indication that the air is clean. In the example above, there is a scent release at the end of the air purification process. There may of course be a periodic release of scent while the air remains clean to reassure the user. Thus a prolonged period with no scent may be an indication that the air purifier needs attention, for example a new filter.

As discussed above, embodiments make use of a controller 18. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An air purifier, comprising:
   an air purifier filter unit;
   a sensor adapted to sense a matter to be filtered by the air purifier filter unit;
   a user interface; and
   a controller,
   wherein the controller is adapted to monitor a performance of the air purifier using the sensor by determining a clean air delivery rate,
   wherein the controller is further adapted to obtain air filtering capability information about the air purifier filter unit,
   wherein the controller is further adapted to determine a volume of a space in which the air purifier is deployed based on a comparison of the air filtering capability information about the air purifier filter unit and the performance of the air purifier using the sensor, and
   wherein the controller is further adapted to control the user interface for at least displaying the performance of the air purifier.

2. The air purifier as claimed in claim 1, wherein the air purifier filter unit includes a machine readable identifier which stores the air filtering capability information about the air purifier filter unit.

3. The air purifier as claimed in claim 1, wherein the controller is further adapted to determine a reference volume of the space from the clean air delivery rate obtained during a calibration procedure during which the air purifier is operated in the space and the space is configured to be non-ventilated.

4. The air purifier as claimed in claim 3, wherein the controller is further adapted to determine if the space is ventilated based on comparing a currently determined volume of the space with the reference volume of the space.

5. The air purifier as claimed in claim 1, further comprising a chemical release device, wherein the controller is further adapted to control the chemical release device in dependence on a currently determined volume of the space.

6. The air purifier as claimed in claim 5, wherein the controller is further adapted to control the chemical release device in dependence on a sensor output of the sensor.

7. The air purifier as claimed in claim 1, wherein the controller is further adapted to determine an end of life prediction information for the air purifier filter unit based on the air filtering capability information about the air purifier filter unit and a sensor output of the sensor.

8. The air purifier as claimed in claim 4, wherein the controller is further adapted to determine if the space is ventilated based on determining if the currently determined volume of the space is within a predefined range of the reference volume of the space.

\* \* \* \* \*